April 6, 1937.   R. E. McINTOSH   2,075,952
EXPANSION BOLT
Filed Sept. 14, 1935
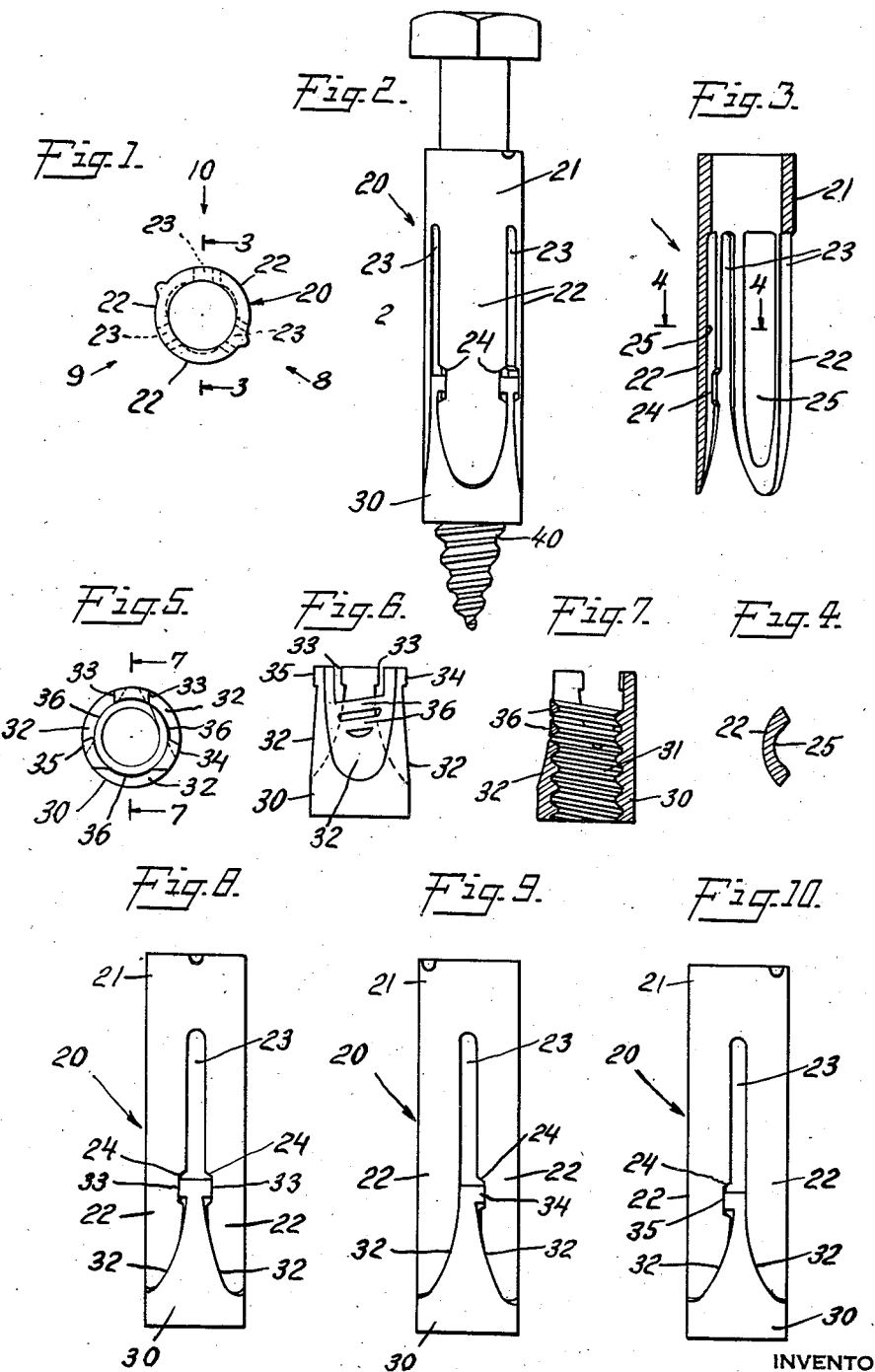
INVENTOR
Roy E. McIntosh
BY
Marshall & Hawley
ATTORNEYS Patented Apr. 6, 1937

2,075,952

UNITED STATES PATENT OFFICE 2,075,952

EXPANSION BOLT

Roy E. McIntosh, New York, N. Y., assignor to Ralph E. Ogden, Mountainville, N. Y.

Application September 14, 1935, Serial No. 40,519

9 Claims. (Cl. 85—2.4)

This invention relates to improvements in expansion bolts of the type comprising an expansible shell and a tapered nut. Its object is to provide a simple structure whereby the effective length of the internal thread of the nut is extended and whereby the proper assembly of the shell and nut is insured. Another object is to provide a device which may be used with lag screws.

These and other objects of the invention will appear in the following specification in which a structure of a preferred embodiment of the invention will be described and its novel features pointed out in appended claims.

Referring to the drawing:

Figure 1 is a plan view of a device which embodies my invention;

Figure 2 is an elevation of the device shown in Figure 1 with a lag screw in it;

Figure 3 is a sectional elevation of the shell shown in Figures 1 and 2, the section being taken on the line 3—3 of Figure 1;

Figure 4 is a sectional plan view of a part of the shell shown in Figure 3, the section being taken on the line 4—4 of the latter figures.

Figure 5 is a plan view of the nut shown in Figure 2;

Figure 6 is an elevation of the nut;

Figure 7 is a sectional elevation of the nut, on the line 7—7 of Figure 5.

Figures 8, 9 and 10 are elevations of the shell and nut assembled, the views being taken respectively in the directions indicated by the arrows 8, 9 and 10 in Figure 1.

Like characters of reference designate corresponding parts in all figures of the drawing. The device comprises a shell 20 and a nut 30. The upper end 21 of the shell is a hollow cylindrical collar from which extends a plurality of fingers 22, in this case three. The outer surfaces of these fingers form a continuation of the outer surface of the collar 21. The figures are separated by slots 23. The sides of one of the fingers adjacent the slots are straight. The sides of the other fingers adjacent the slots are interrupted by notches 24. These notches between two of the figures are opposite each other (Figure 8), and those opposite the finger with uninterrupted sides lie in opposite directions. (Figures 9 and 10). The purpose of this arrangement will appear later.

The inner surfaces of the fingers are tapered near their lower ends, as shown in Figure 3. Longitudinal grooves 25 (Figures 3 and 4) are formed in these tapered inner surfaces of the fingers for a purpose which will appear hereinafter.

The inside of the nut 30 is provided with threads 31. In the specific form shown these threads are formed to fit those of a standard lag screw 40 (Figure 2). The outside of the nut is generally cylindrical but is cut back to form three beveled surfaces 32 leaving three upstanding posts between them. These beveled surfaces are adapted to fit the inclined inner surfaces of the shell fingers 22 and the upstanding posts extend into the slots 23 in the shell when the parts are assembled.

The upper edge of one of the posts extends laterally in both directions to form lugs 33, 33. These are adapted to extend into the oppositely disposed notches 24 shown in Figure 8. The upper edges of the other posts extend laterally in opposite direction to form lugs 34 and 35 which are adapted to extend into the other notches 24, as shown in Figures 9 and 10 respectively. This arrangement is such as to preclude the insertion of the nut in the shell in but one predetermined angular relation and thus insure the proper inter-relation of these parts. The engagement of the lugs 33, 34, 35 with the shell serves to retain the nut in the shell.

The thread 31 would be cut away by the inclined surfaces 32 and its effective length shortened thereby. To overcome this difficulty, arcuate bridges 36, the inner portions of which form continuations of the threads 31, extend across the spaces formed by the intersections of the plane of the inclined surfaces 32 with the bore of the nut. These project outwardly from the inclined surfaces and it is for the purpose of receiving them that the longitudinal grooves 25 are provided in the shell fingers 22. These bridges also serve to strengthen the structure.

The manner of using the device is well known. The assembled shell and nut are placed in a hole made to receive them. A desired article may be anchored to the structure in which the device is inserted by means of a lag screw 40 which when turned against the article to be anchored will draw the nut into the shell and spread the shell fingers apart.

A preferred structure embodying this invention has been illustrated and described, but modifications of construction may be made without departing from its spirit and scope and I intend no limitations other than those imposed by the appended claims.

What I claim is:

1. A tubular expansion shell constructed with three longitudinal slots dividing the greater part of the length of the shell into fingers having parallel grooves on their inner surfaces, a notch in the side of one of the fingers, the inner surfaces of said fingers near their ends being inclined, and an internally threaded nut having external portions adapted to move in said parallel grooves and external inclined surfaces adapted to coact with the inclined surfaces of the fingers, posts between the inclined surfaces of the nut adapted to extend into the slots in the shell and a lug extending laterally from the upper end of one of the posts adapted to extend into said notch.

2. A tubular expansion shell constructed with three longitudinal slots dividing the greater part of the length of the shell into fingers having parallel grooves on their inner surfaces, notches in the sides of some of the fingers, the inner surfaces of said fingers near their ends being inclined, and an internally threaded nut having external portions adapted to move in said parallel grooves and external inclined surfaces adapted to coact with the inclined surfaces of the fingers, posts between the inclined surfaces of the nut adapted to extend into the slots in the shell and lugs extending laterally from the upper ends of the posts adapted to extend into said notches.

3. A tubular expansion shell constructed with three longitudinal slots dividing the greater part of the length of the shell into fingers having parallel grooves on their inner surfaces, notches in the sides of some of the fingers, the inner surfaces of said fingers near their ends being inclined and an internally threaded nut having external portions adapted to move in said parallel grooves and external inclined surfaces adapted to coact with the inclined surfaces of the fingers, posts between the inclined surfaces of the nut adapted to extend into the slots in the shell, a pair of lugs extending laterally from the upper end of one of the posts adapted to extend into two of said notches, and lugs extending in opposite directions from the upper end of two other posts adapted to extend into two other of said notches, whereby the assembly of the shell and the nut in but one relative, angular position is insured.

4. A nut for expansion bolts, said nut having an internally threaded bore, external inclined surfaces or planes intersecting said bore and arcuate bridges spanning the spaces formed by the intersection of said planes with the bore and forming continuations of the thread.

5. A nut for expansion bolts, said nut having an internally threaded bore, external inclined surfaces or planes intersecting said bore and arcuate bridges spanning the spaces formed by the intersection of said planes with the bore and forming continuations of the thread, combined with an expansion shell having internal inclined surfaces adapted to coact with the inclined surfaces of the nut with longitudinal grooves in said internal inclined surfaces to receive said bridges.

6. A tubular expansion shell constructed with longitudinal slots dividing a part of the length of the shell into fingers, notches in the sides of some of the fingers, the inner surfaces of said fingers being inclined and a nut having external inclined surfaces adapted to coact with the inclined surfaces of the fingers, posts between the inclined surfaces of the nut adapted to extend into the slots in the shell, a pair of lugs extending laterally from the upper end of one of the posts adapted to extend into two of said notches, and lugs extending in opposite directions from the upper end of two other posts adapted to extend into two other of said notches, said nut having an internally threaded bore intersected by the planes of its inclined surfaces and arcuate bridges spanning the spaces formed by the intersection of said planes with the bore and forming continuations of the threads, and longitudinal grooves in the inclined surfaces of the shell fingers to receive said bridges.

7. An expansion shell having a thin body and a longitudinal bore, said shell being constructed with longitudinal slots dividing a part of the length of the shell into fingers, the internal surfaces of the end portions of said fingers being flared from said bore to form inclined surfaces, combined with a screw having a thread of an external diameter corresponding with that of the bore and a nut having an internally threaded bore to fit the thread of the screw and external inclined surfaces corresponding with said inner inclined surfaces of the fingers, the planes of said external surfaces of the nut intersecting its thread and forming arcuate bridges spanning the spaces formed by the intersection of said planes with the thread and forming continuations of the thread of the nut whereby the thread of the screw extends through said spaces.

8. An expansion shell having a thin body and a longitudinal bore, said shell being constructed with longitudinal slots dividing a part of the length of the shell into fingers, the internal surfaces of the end portions of said fingers being flared from said bore to form inclined surfaces, a notch in the side of one of the fingers combined with a screw having a thread of an external diameter corresponding with that of the bore and a nut having an internally threaded bore to fit the threads of the screw and external inclined surfaces corresponding with said inner inclined surfaces of the fingers, the planes of said external surfaces of the nut intersecting its thread and forming arcuate bridges spanning the spaces formed by the intersection of said planes with the thread and forming continuations of the thread of the nut whereby the thread of the screw extends through said spaces, posts between the inclined surfaces of the nut adapted to extend into the slots in the shell and a lug extending laterally from the upper end of one of the posts adapted to extend into said notch.

9. An expansion shell having a thin body and a longitudinal bore, said shell being constructed with longitudinal slots dividing a part of the length of the shell into fingers, the internal surfaces of the end portions of said fingers being flared from said bore to form inclined surfaces, notches in the sides of some of the fingers combined with a screw having a thread of an external diameter corresponding with that of the bore and a nut having an internally threaded bore to fit the thread of the screw and external inclined surfaces corresponding with said inner inclined surfaces of the fingers, the planes of said external surfaces of the nut intersecting its thread and forming arcuate bridges spanning the spaces formed by the intersection of said planes with the thread and forming continuations of the thread of the nut whereby the thread of the screw extends through said spaces, posts between the inclined surfaces of the nut adapted to extend into the slots in the shell, a pair of lugs extending laterally from the upper end of one of the posts adapted to extend into two of said notches, and lugs extending in opposite directions from the upper end of two other posts adapted to extend into two other of said notches.

ROY E. McINTOSH.